United States Patent Office  3,248,426
Patented Apr. 26, 1966

3,248,426
N-(1-NAPHTHYLMETHYL)-GUANIDINE AND
ACID ADDITION SALT THEREOF
Dusan M. Dvornik, Montreal, Quebec, Canada, assignor
to American Home Products Corporation, New York,
N.Y., a corporation of Delaware
No Drawing. Filed Mar. 1, 1962, Ser. No. 176,798
2 Claims. (Cl. 260—564)

This invention is directed to a class of N', N''-substituted N-1-naphthylmethyl-guanidines of the generic formula

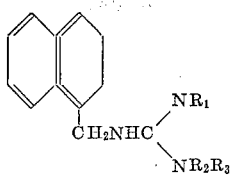

in which $R_1$, $R_2$, and $R_3$ represent hydrogen or lower alkyl, and to acid addition salts of these compounds with therapeutically-acceptable inorganic and organic acids.

My invention is also concerned with the process by which these new chemical compounds can be prepared from available starting materials.

The new guanidine compounds of this invention and their salts have hypotensive properties which are due to selective peripheral sympathetic blockade. A particular characteristic of these compounds is their good intestinal absorption after oral administration, which property is especially desirable in the treatment of chronic hypertension.

The new guanidine compounds may be prepared by reacting 1-naphthylmethylamine with a reagent capable of converting the amino group in the starting material to a guanidino group, and/or, if desired, converting a free compound into a salt thereof.

The preferred reagents for this conversion are S,N', N''-lower alkyl-isothioureas or, preferably, their acid addition salts, particularly their salts with mineral acids of the general formula

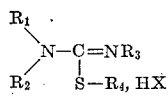

where $R_1$, $R_2$ and $R_3$ are hydrogen or lower alkyl, and $R_4$ lower alkyl.

1-Naphthylmethylamine is brought into contact with the reagent, preferably in the presence of a solvent, the choice of which depends primarily on the solubility of the reactants. Water and water-miscible organic solvents, such as lower alkanols, may be used as diluents. The reaction is preferably carried out at the boiling temperature of the solvent and in the atmosphere of an inert gas, e.g., nitrogen.

A second modification of the procedure for the preparation of the guanidines of this invention comprises reacting 1-naphthylmethylamine with a salt of a 1-guanyl-3, 5 - dimethyl - pyrazole, preferably a mineral acid salt. 1-Guanyl-3,5-dimethyl-pyrazole nitrate represents a preferred reagent. The reaction may be carried out by fusing the reactants to the melting point of the mixture, or in the presence of a diluent, such as, for example, a lower alkanol, preferably n-butanol, at the boiling temperature of the solvent, and, advantageously, by excluding carbon dioxide, for example by carrying out the reaction in the atmosphere of an inert gas, e.g., nitrogen.

The new guanidine compounds may be obtained in the form of the free bases or as salts thereof. A salt may be converted into the free base in the customary way as, for example, by treatment with a silver salt, a strong alkaline reagent, such as aqueous metal hydroxide, or with a strong quaternary ammonium anion exchange resin. A free base may be transformed into its therapeutically useful acid addition salts by reacting the latter with an appropriate inorganic or organic acid. Such reactions may be carried out in a solvent, such as lower alkanol, an ether and the like, and then isolating the desired salt.

These reactions may be represented by the following formulae:

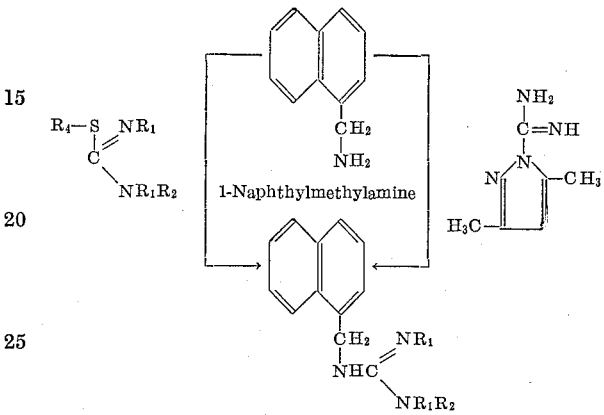

The following examples illustrate the invention:

EXAMPLE 1

N-(1-Naphthylmethyl)-guanidinium iodide—method (A)

An emulsion of 1-naphthylmethylamine (16.8 g., 107.0 millimoles) and S-methyl-isothiouronium iodide (23.4 g., 107.0 millimoles) in water (50 ml.) was stirred and refluxed for six and one-half hours in an atmosphere of nitrogen. On cooling, the resulting clear, slightly colored solution deposited crystals, which were filtered off. The crystalline iodide salt (20 g.) was dissolved in hot water (100 ml.), made strongly alkaline by the addition of sodium hydroxide, and the formed oily base [infrared spectrum (max.) (chloroform): 1580 cm.$^{-1}$] extracted with chloroform. The chloroform solution was dried over anhydrous sodium sulfate and dry hydrogen chloride was introduced. The precipitated oily chloride salt crystallized spontaneously on addition of ethyl acetate. M.P. 197–200° C. after recrystallization from methanol-ethyl acetate.

Analysis confirmed the empiric formula $C_{12}H_{14}ClN_3$—Required: Cl (ionic), 15.09%. Found: Cl (ionic), 15.11%.

EXAMPLE 2

N-(1-Naphthylmethyl)-guanidinium iodide—method (B)

To a solution of 1-naphthylmethylamine (7.0 g., 44.5 millimoles) in n-butanol (80 ml.), 1-guanyl-3,5-dimethyl-pyrazole nitrate (44.5 millimoles) was added, and the mixture refluxed for two hours in an atmosphere of nitrogen. On cooling, the product crystallized spontaneously. The precipitate was collected by filtration, dissolved in methanol, water was added, the hot solution treated with charcoal and filtered. On cooling an oil separated which crystallized on standing. The nitrate salt (8.0 g.) (M.P. 154–160° C.) was dissolved in a few millilitres of methanol and made strongly alkaline by the addition of sodium hydroxide. The separated oily base, which solidified on cooling, was filtered off, dissolved in methanol and acidified with gaseous hydrogen chloride. The resultant solution was evaporated to dryness under reduced pressure, taken up in acetone, and the chloride salt precipitated by the addition of ether. After recrystallization from a methanolethyl acetate mixture it melted at 198°

C. and proved to be identical with the product prepared as described in Example 1.

EXAMPLE 3

*N-(1-naphthylmethyl)-N'-methyl-guanidinium iodide*

Proceeding as in Example 1, i.e., starting with 1-naphthylmethylamine (5.3 g., 33.6 millimoles) but using N,S-dimethyl-isothiouronium iodide (7.8 g., 33.6 millimoles) in water (25 ml.), N-(1-naphthylmethyl)-N'-methyl-guanidinium iodide [infrared spectrum (max.) (chloroform) of free base: 1620, 1420 cm.$^{-1}$] was prepared, M.P. 189–190° C., after recrystallization from methanol-ethyl acetate.

Analysis confirmed the empiric formula $C_{13}H_{16}IN_3$—Required: I (ionic), 37.18%. Found: I (ionic), 36.59%.

EXAMPLE 4

*N-(1-naphthylmethyl)-N'-methyl-guanidinium chloride*

A suspension of the above iodide salt (3.7 g., 10.9 millimoles) and freshly precipitated silver chloride (1.9 g., 13.2 millimoles) in methanol (35 ml.) was shaken for thirty minutes. The suspension was filtered through a layer of celite and the filtrate evaporated to dryness under reduced pressure. The residue crystallized spontaneously on treatment with acetone and ether. M.P. 210–211° C. after crystallization from methanol-ethyl acetate.

Analysis confirmed the empiric formula $C_{13}H_{16}ClN_3$—Required: Cl (ionic), 14.20%. Found: Cl (ionic), 14.31%.

EXAMPLE 5

*N-(1-naphthylmethyl)-N'-n-butyl-guanidinium picrate*

A solution of 1-naphthylmethylamine (4.6 g., 29.2 millimoles) and N'-n-butyl-S-methyl-isothiouronium iodide (8.0 g., 29.2 millimoles) in n-butanol (15 ml.) was refluxed for four and one half hours in an atmosphere of nitrogen. After cooling, the solution was evaporated to dryness under reduced pressure, the oily residue dissolved in water, the solution made alkaline by the addition of sodium hydroxide pellets and extracted with ether. The combined ether extracts were dried over a mixture of potassium carbonate and sodium hydroxide, filtered and evaporated to dryness under reduced pressure. The residual oil (8.5 g.) was dissolved in benzene and neutralized by the addition of an ethereal solution of hydrogen chloride. The supernatant was decanted, the residual oil dissolved in chloroform, the solution washed with water, dried over sodium sulfate and evaporated to dryness under reduced pressure. From the residual oily hydrochloride (6.1 g.) the free base was liberated, [infrared spectrum (max.) (chloroform): 1620, doublets at 1470 and 1480 cm.$^{-1}$], taken up in ether, dried, and made slightly acid by the addition of an acetone solution of picric acid. The solvents were removed under reduced pressure, the oily residue dissolved in chloroform, washed with water, dried and evaporated to dryness under reduced pressure. The residual oil (8.3 g.) crystallized on addition of ether. M.P. 127–128° C. after recrystallization from isopropanol-ether.

Analysis confirmed the empiric formula $C_{22}H_{24}N_6O_7$—Required: C, 54.55; H, 4.99; N, 17.35. Found: C, 55.07; H, 5.22; N, 17.38.

EXAMPLE 6

*N-(1-naphthylmethyl)-N',N''-dimethyl-guanidinium iodide*

Proceeding as in Example 1, i.e. starting with 1-naphthylmethylamine (7.0 g., 44.5 millimoles), but using N',N'',S-trimethyl-isothiouronium iodide (11.0 g., 44.5 millimoles) in n-butanol (15 ml.), N-(1-naphthylmethyl)-N',N''-dimethyl-guanidinium iodide [infrared spectrum (max.) (chloroform) of free base: 1640 cm.$^{-1}$] was prepared, M.P. 209–211° C. after recrystallization from water.

Analysis confirmed the empiric formula $C_{14}H_{18}IN_5$—Required: I (ionic), 35.74%. Found: I (ionic) 35.44%.

I claim:
1. N-(1-naphthylmethyl)-guanidine.
2. N-(1-naphthylmethyl)-guanidinium chloride.

References Cited by the Examiner

UNITED STATES PATENTS

| | | | |
|---|---|---|---|
| 1,805,889 | 5/1931 | Schoeller et al. | 260—565 |
| 2,959,616 | 11/1960 | Birtwell | 260—565 |
| 3,071,618 | 1/1963 | Pinson | 260—567.6 |
| 3,079,403 | 2/1963 | Weinstock | 260—349 |

OTHER REFERENCES

Boura et al.: Nature, vol. 191, pp. 1312–1313 (1961).
Conant et al.: "The Chemistry of Organic Compounds," p. 549 (1952).
Davis et al.: J.A.C.S., vol. 59, pp. 2112–2113 (1937).
Harwood, C. A.: vol 27, p. 1676 (1933).
Rajagopolan et al.: C.A., vol. 39, p. 35943 (1945).
Scott et al.: Nature, vol. 169, pp. 72–73 (1952).
Shapiro et al.: J.A.C.S., vol. 81, pp. 3728–3736 (1959).

CHARLES B. PARKER, *Primary Examiner.*

LEON ZITVER, *Examiner.*